(12) United States Patent
Wernet et al.

(10) Patent No.: US 11,233,392 B2
(45) Date of Patent: Jan. 25, 2022

(54) ELECTRONIC FIELD DEVICE WITH TRANSCEIVER PROTECTING CIRCUIT

(71) Applicant: Endress+Hauser SE+Co. KG, Maulburg (DE)

(72) Inventors: Armin Wernet, Rheinfelden (DE); Michael Dötsch, Rickenbach (DE)

(73) Assignee: Endress+Hauser SE+ Co. KG, Maulburg (DE)

( * ) Notice: Subject to any disclaimer, the term of this patent is extended or adjusted under 35 U.S.C. 154(b) by 0 days.

(21) Appl. No.: 16/759,586

(22) PCT Filed: Sep. 17, 2018

(86) PCT No.: PCT/EP2018/075022
§ 371 (c)(1),
(2) Date: Apr. 27, 2020

(87) PCT Pub. No.: WO2019/081127
PCT Pub. Date: May 2, 2019

(65) Prior Publication Data
US 2020/0287381 A1    Sep. 10, 2020

(30) Foreign Application Priority Data
Oct. 26, 2017   (DE) ..................... 10 2017 125 129.4

(51) Int. Cl.
*H02H 9/00*        (2006.01)
*H02H 11/00*       (2006.01)
(Continued)

(52) U.S. Cl.
CPC ............. *H02H 9/04* (2013.01); *G01D 11/245* (2013.01); *G05F 1/571* (2013.01); *G05F 3/18* (2013.01); *H02H 9/008* (2013.01); *H02H 11/002* (2013.01)

(58) Field of Classification Search
CPC ............. H02H 9/008; H02H 9/04–042; H02H 11/002–003; G05F 1/565–573; G05F 3/18–185
See application file for complete search history.

(56) References Cited

U.S. PATENT DOCUMENTS 4,412,265 A * 10/1983 Buuck .................... H02H 9/008
                                                    361/18
6,473,283 B1   10/2002 Melvin et al.
(Continued)

FOREIGN PATENT DOCUMENTS

CN    102593810 A    7/2012
CN    102608445 A    7/2012
(Continued)

OTHER PUBLICATIONS

English translation of "FR2795567A1", Allin Patrice, Protective circuit for electronic module includes three stages to block voltage pulses from mains supply network, Dec. 29, 2000 (Year: 2000).*

*Primary Examiner* — Sisay G Tiku
(74) *Attorney, Agent, or Firm* — Mark A. Logan; Endress+Hauser (USA) Holding Inc.

(57) ABSTRACT

The present disclosure relates to an apparatus for determining and/or monitoring at least one process variable of a medium in a containment, comprising a sensor unit and an electronics unit, wherein the electronics unit includes a transceiver unit and a transceiver protecting unit for limiting an input voltage of the transceiver unit to a first transceiver voltage value. According to the present disclosure, the transceiver protecting unit includes a first limiting unit and a transistor unit, the transistor unit connected in series with the transceiver unit, wherein the first limiting unit is connected in parallel with transceiver unit and to a control terminal of the transistor and is configured to control an input voltage for the control terminal of the transistor to a (Continued)

predeterminable control value such that the input voltage of the transceiver unit is limited to the first transceiver voltage value.

14 Claims, 3 Drawing Sheets

(51) Int. Cl.
*G05F 1/565* (2006.01)
*G05F 1/567* (2006.01)
*H02H 9/04* (2006.01)
*G01D 11/24* (2006.01)
*G05F 1/571* (2006.01)
*G05F 3/18* (2006.01)

(56) References Cited

U.S. PATENT DOCUMENTS

| | | | |
|---|---|---|---|
| 9,071,073 B2 * | 6/2015 | Bourilkov | H02J 7/045 |
| 9,829,872 B2 * | 11/2017 | Schauble | G05B 19/042 |
| 10,942,499 B2 * | 3/2021 | Kumar KN | H02H 9/008 |
| 2009/0102601 A1 * | 4/2009 | Mathiesen | G05B 19/4185 |
| | | | 340/3.1 |
| 2009/0253388 A1 * | 10/2009 | Kielb | G01D 21/00 |
| | | | 455/117 |
| 2012/0293015 A1 * | 11/2012 | Johnson | G06F 3/147 |
| | | | 307/117 |
| 2016/0098055 A1 * | 4/2016 | Solosky | G05F 3/08 |
| | | | 361/18 |
| 2016/0104979 A1 | 4/2016 | Korn et al. | |
| 2016/0182323 A1 * | 6/2016 | Ferguson | H04L 43/062 |
| | | | 709/224 |
| 2018/0066804 A1 * | 3/2018 | Grumstrup | G08B 21/20 |
| 2018/0198481 A1 * | 7/2018 | Bavois | H04L 12/40032 |
| 2020/0264643 A1 * | 8/2020 | Banerjee | G05F 1/56 |
| 2021/0003688 A1 * | 1/2021 | Bu | H01S 1/02 |
| 2021/0014935 A1 * | 1/2021 | Gozalvez Serrano | |
| | | | H04B 7/0817 |

FOREIGN PATENT DOCUMENTS

| | | | |
|---|---|---|---|
| CN | 105896503 A | | 8/2016 |
| CN | 106796437 A | | 5/2017 |
| DE | 2625307 A1 | | 12/1977 |
| DE | 3533750 C1 | | 3/1987 |
| DE | 3931537 A1 | | 4/1991 |
| FR | 2795567 A1 | * | 12/2000 |
| FR | 2795567 A1 | | 12/2000 |

* cited by examiner

ELECTRONIC FIELD DEVICE WITH TRANSCEIVER PROTECTING CIRCUIT

CROSS-REFERENCE TO RELATED APPLICATIONS

The present application is related to and claims the priority benefit of German Patent Application No. 10 2017 125 129.4, filed on Oct. 26, 2017 and International Patent Application No. PCT/EP2018/075022, filed on Sep. 17, 2018, the entire contents of which are incorporated herein by reference.

TECHNICAL FIELD

The present invention relates to an apparatus having at least a sensor unit and an electronics unit and serving for determining and/or monitoring at least one process variable of a medium in a containment. The apparatus of the invention is especially a field device, which serves for monitoring and/or determining at least one, for example, chemical or physical, process variable of a medium. The medium is, for example, a liquid or a gas. The terminology, containment, means, in the context of the invention, all apparatuses known to those skilled in the art and embodied to collect and/or to convey, a medium, thus, for example, apparatuses such as containers or pipelines.

BACKGROUND

Usually, the sensor unit of the field device comes at least partially and at least at times in contact with the process and serves for registering a signal representing the particular process variable of interest. The electronics unit serves, in turn, for example, for signal registration, —evaluation and/or—feeding. For communication to a superordinated unit, for example, a data processing unit, or a process control station, the electronics unit includes typically a transceiver unit, which serves especially for signal transmission.

In the context of the present invention, in principle, all measuring devices are referred to as field devices, which are applied near to the process and which deliver, or process, process relevant information, thus, also remote I/Os, radio adapters, and, generally, electronic components, which are arranged at the field level. A large number of such field devices are produced and sold by the Endress+Hauser group of companies.

For example, the field device can be a fill level measuring device, flowmeter, pressure—and temperature measuring device, pH- and/or pH-redox potential measuring device, or even a conductivity measuring device, which serves for registering a corresponding process variable, such as a fill level, a flow, a pressure, a temperature, a pH value, a redox potential, or a conductivity. The relevant measuring principles are known from the state of the art and are not here individually set forth. In the case of flowmeters, included are especially Coriolis-, ultrasonic, vortex-, thermal and/or magnetically inductive flowmeters. Fill level measuring devices, in turn, include especially microwave, fill level measuring devices, ultrasonic, fill level measuring devices, time domain reflectometric, fill level measuring devices (TDR), radiometric, fill level measuring devices, capacitive, fill level measuring devices, conductivity, fill level measuring devices and/or temperature sensitive, fill level measuring devices. Also, limit level switches are relevant in this regard. In the case of pressure measuring devices, in contrast, included are preferably absolute—, gage or relative—and difference pressure devices. A temperature measuring device can preferably have a thermocouple or a temperature dependent resistance for ascertaining the temperature.

In order to enable stable operation of a field device, depending on the particular application, a wide variety of requirements must be met. An important point relates to the electromagnetic compatibility (EMC) of the field device. Typical causes of disturbance relative to EMC concern fluctuations and/or interruptions of the supply voltage, the discharge of static electricity, electromagnetic fields in the environment of the field device as well as the occurrence of transient overvoltages in the form of groups of pulses or single pulses. Concerning the EMC of field devices, reference is made especially to the standards, DIN EN 61326-1, NE21 and IFU61131-9, which establish both requirements relative to the disturbance resistance of a field device as well as different limit values for disturbance emissions. As regards these limit values, for example, the length of the supply lines, as well as whether the particular field device can be connected to a local direct current power supply grid or not, are taken into consideration. Depending on contemplated application of a field device, the application dependent requirements for the field device, especially for the components of the electronics, can vary greatly.

SUMMARY

An object of the present invention is, thus, to provide a measuring device, for which a high electromagnetic compatibility can be assured in simple and cost-effective manner for different applications.

This object is achieved by an apparatus for determining and/or monitoring at least one process variable of a medium in a containment, comprising a sensor unit and an electronics unit, which includes a transceiver unit and a transceiver protecting unit for limiting an input voltage of the transceiver unit to a first predeterminable transceiver voltage value. The transceiver protecting unit of the invention includes a first limiting unit and a transistor unit having at least one transistor, wherein the transistor unit is connected in series with the transceiver unit, wherein the first limiting unit is connected in parallel with the transceiver unit and to a control terminal of the transistor, and wherein the first limiting unit is embodied, in the case, in which a supply voltage for the electronics unit exceeds a predeterminable limit value, to control an input voltage for the control terminal of the transistor to a predeterminable control value, in such a manner that the input voltage of the transceiver unit is limited to the first predeterminable transceiver voltage value.

The transceiver unit has preferably a control unit for controlling an input- and/or output voltage of the transceiver unit and at least one terminal element. The terminal element is preferably an input, an output or a combined in- and output. By means of the transceiver unit, for example, a uni- or bidirectional transmission of signals between the apparatus and a superordinated unit can be performed. The superordinated unit in such case is, for example, a data processing unit or a process control station.

Typical transceiver units of field devices are usually only designed for low transient energies, since such units are connected locally within a device to its own power supply. Depending on grouping in such case, so-called surge- and burst-sources with different internal resistances are normatively taken into consideration. A protection of the transceiver unit against overvoltages is correspondingly required for a location independent use, especially also for assuring the typical requirements relative to EMC. Known from the state of the art is to limit an input voltage of the transceiver unit by the use of diodes, varistors, or gas dischargers. These variants have, however, various disadvantages.

In the case of diodes, the achievable voltage limiting, thus the achievable maximum value for the input voltage of the transceiver unit, depends on the electrical current flowing through the diodes and on the internal resistance. Thus, with increasing electrical current, the maximum value for the input voltage of the transceiver unit disadvantageously rises. For many applications, such a voltage limiting is correspondingly insufficient, and the maximum allowable power of the diodes can be quickly exceeded.

In the case of varistors, there is the disadvantage that in the case of high currents they can no longer provide a sufficient voltage limiting. In the case of gas dischargers, in turn, a great disadvantage in their use is that a comparatively high voltage value is required for ignition of the arc, and that alone can damage the transceiver unit.

For preventing these disadvantages, the present invention provides the use of a transceiver protecting unit, which comprises a transistor unit and at least a first limiting unit. The transceiver protecting unit limits the input voltage of the transceiver unit to a predeterminable transceiver voltage value. The transceiver protecting unit, thus, protects the transceiver unit against overvoltages. If the supply voltage at least at times exceeds a predeterminable limit value, for example, by the occurrence of a surge or burst, the input voltage of the transceiver unit is limited to the predeterminable transceiver voltage value.

In an embodiment, the transistor is a bipolar transistor with at least one resistance, especially an ohmic resistance, or a field effect transistor. In the case of the control terminal of the transistor, it is correspondingly preferably a base or a gate of the transistor.

Regarding the first limiting unit, such advantageously comprises at least one voltage limiting element, for example, a diode, especially a Zener diode or an avalanche diode or a varistor.

An advantageous embodiment provides that the apparatus further comprises a second limiting unit for limiting the input voltage of the transceiver unit, wherein the second limiting unit is connected between first and second supply lines of the transceiver unit. Preferably, the second limiting unit is additionally arranged before the transistor unit and the first limiting unit. The second limiting unit cares for a pre-limiting of the input voltage of the transceiver unit. In such case, the second limiting unit advantageously comprises at least one voltage limiting element, especially a varistor, a gas discharger, or a diode, especially a suppressor diode, especially a Transzorb® diode.

Another advantageous embodiment provides that the apparatus further comprises a third limiting unit for limiting a voltage applied to a terminal element of the transceiver unit. In the case of this terminal element, such is a supplemental terminal element, for example, an in/out-connection. In this way, additionally, at least one further terminal element of the transceiver unit can be protected against overvoltages, especially transient overvoltages.

For this embodiment, advantageously the third limiting unit comprises at least one voltage limiting element, especially a diode, for example, a suppressor diode, especially a Transzorb® diode, or a varistor.

In a preferred embodiment, the apparatus further comprises a rectification unit for rectifying the input voltage of the transceiver unit. The rectification unit can be, for example, a rectification circuit, especially a bridge circuit. The rectification unit is, furthermore, preferably placed in front of the limiting units and the transistor unit.

Alternatively, another especially preferred embodiment provides that the apparatus further comprises a reverse protection unit, which is embodied to remove at least one signal portion of the supply voltage with a polarity opposite to the polarity of the input voltage of the transceiver unit. The supply signal, or the supply voltage, can have from time to time signal fractions with opposed polarity, especially so-called bursts or surges, thus, voltage pulses. Such are removed from the supply signal by the reverse protection unit and, thus, do not reach the transceiver unit.

The reverse protection unit advantageously comprises at least two diodes. Preferably in such case, a first diode is connected in series with the first limiting unit, and a second diode is arranged between the transistor unit and the transceiver unit.

With the rectification unit or the reverse protection unit, it can be advantageously achieved that both transients with positive polarity as well as also transients with negative polarity can be handled by the same circuit arrangement for voltage limiting.

In an additional embodiment, an input and an output of the transceiver unit are implemented via a single terminal element, wherein the electronics unit has at least one switch element. Alternatively, however, also the input of the transceiver unit can be implemented via a first terminal element and the output of the transceiver unit via a second terminal element.

Advantageously, the electronics unit is embodied to supply the sensor unit with an excitation signal, and to receive from the sensor unit a received signal representing the process variable. The received signal is then, for example, evaluated by the electronics unit.

Thus, the electronics unit can, for example, determine and/or monitor the process variable based on the received signal, produce a corresponding measurement signal and forward such by means of the transceiver unit to a superordinated unit. Alternatively, however, the received signal can also be forwarded by means of the transceiver unit directly to a superordinated unit for additional evaluation.

In an additional embodiment, the transceiver unit is at least partially embodied in the form of an integrated circuit.

BRIEF DESCRIPTION OF THE DRAWINGS

The invention will now be explained in greater detail based on the appended drawing, the figures of which show as follows.

DETAILED DESCRIPTION

Figure 1:
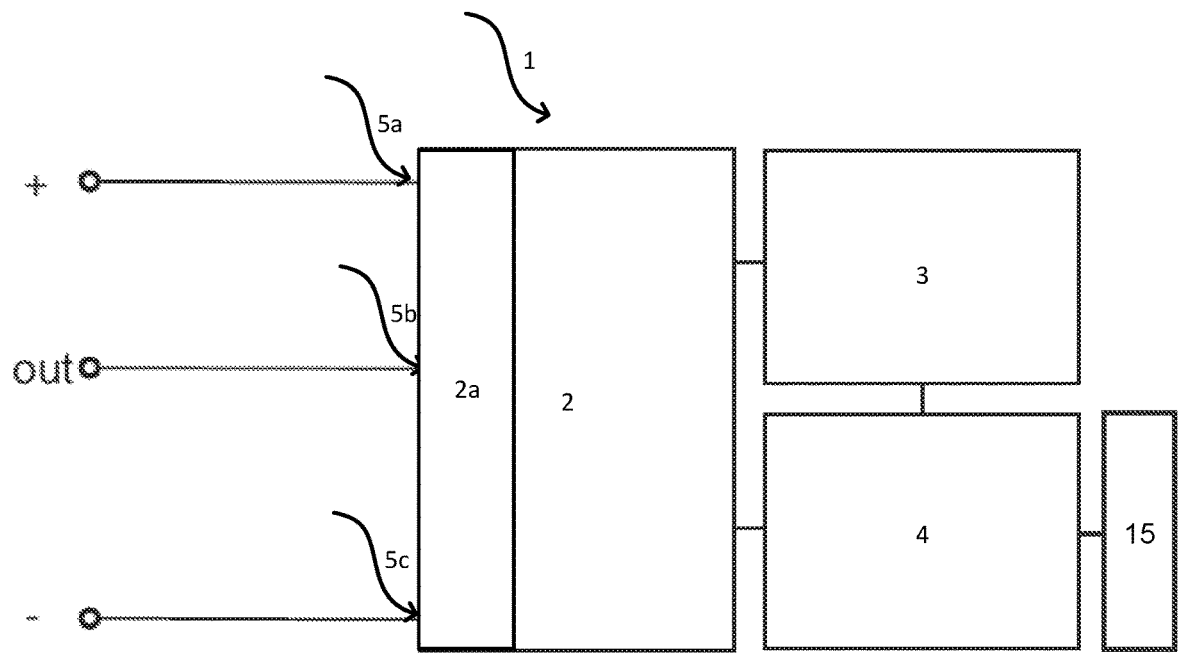
FIG. 1 shows a schematic view of an electronics unit of a field device having a transceiver unit according to the state of the art.

FIG. 1 shows a schematic view of an electronics unit 1 of a field device. Without intending to limit the general applicability of the invention, the field device illustrated in this special example is a so-called three conductor field device having three terminal lines, or terminal elements (5a, 5b, 5c). The electronics unit 1 includes a transceiver unit 2, a computing unit 3 and a measuring section 4. The measuring section preferably has electronic components, which serve for registering a respective measured variable sensed by the sensor element 15 and converting it into an electrical signal. The transceiver unit 2, in turn, serves, among other things, for communication with a superordinated unit (not shown). For this, the transceiver unit 2 includes a control unit 2a. Since usual transceiver units 2 are designed for only comparatively small transients, application of an electronics unit 1 as shown in FIG. 1 is limited.

Figure 2:
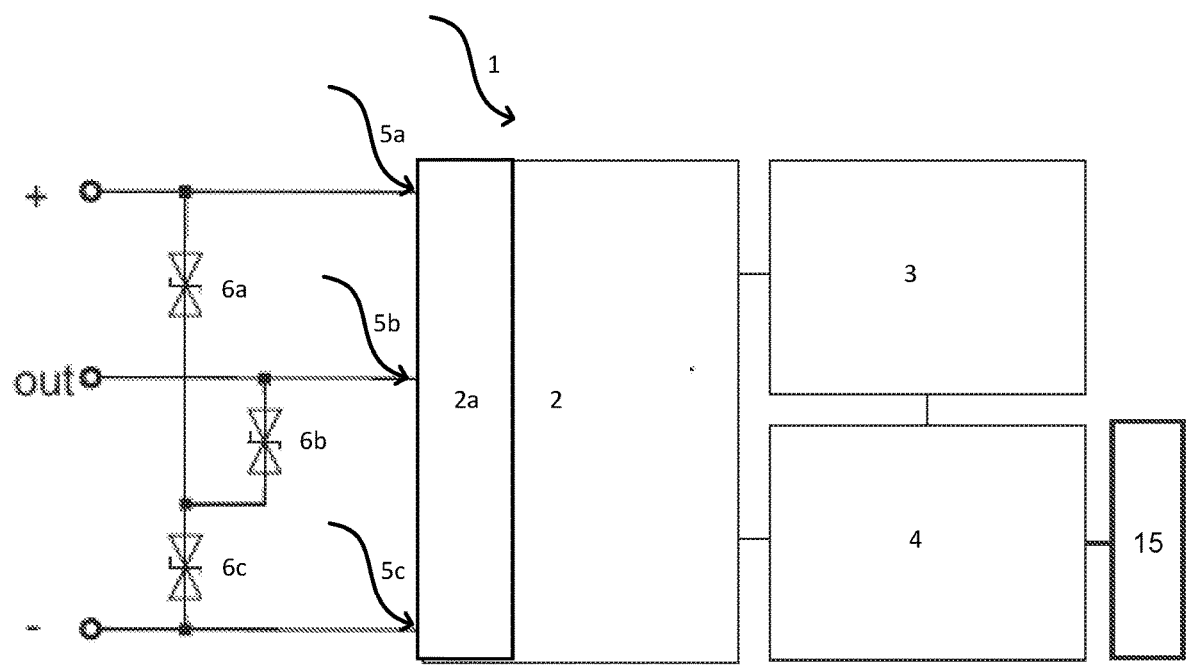
FIG. 2 shows a schematic view of an electronics unit of a field device having a transceiver unit with an additional voltage limiting according to the state of the art.

Especially for protecting the transceiver unit, it is known from the state of the art to apply one or more voltage limiting elements, in order to expand the fields of use for a corresponding electronics unit 1 with transceiver unit 2. Frequently applied for this are diodes 6a, 6b, 6c, such as shown, by way of example, in FIG. 2. As already mentioned, these measures known from the state of the art for protecting the transceiver unit have various disadvantages, which are overcome by the solution of the invention.

Figure 3:
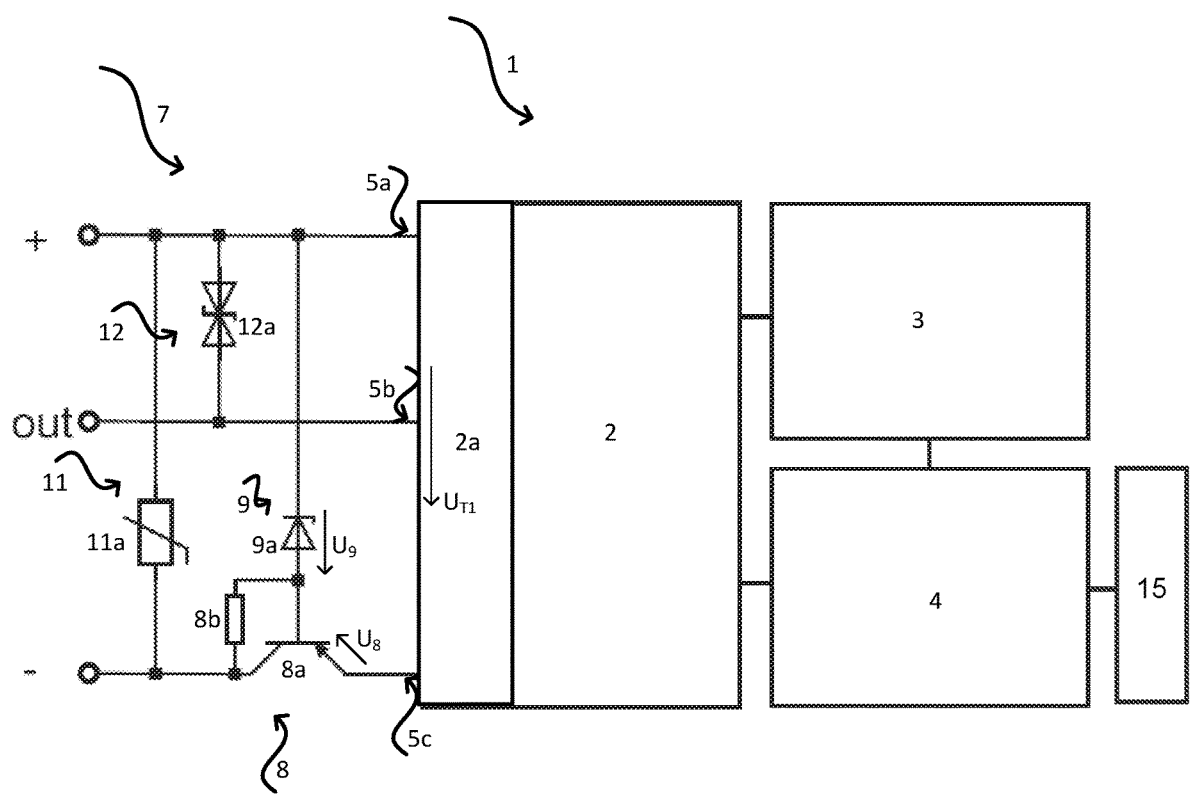
FIG. 3 shows a schematic view of an electronics unit of the present disclosure having a transceiver protecting unit in a first embodiment.

A first embodiment of an electronics unit 1 of the invention is shown in FIG. 3. According to the invention, the electronics unit includes a transceiver protecting unit 7 comprising a transistor unit 8 and a first limiting unit 9. In the example shown here, the transistor unit 8 comprises a bipolar transistor 8a with a resistor 8b. The transistor unit 8 is connected in series with transceiver unit 2. The first limiting unit 9 has a diode 9a as voltage limiting element and is connected to the base of the transistor 8a.

In the case, in which the supply voltage exceeds a predeterminable limit value, which essentially corresponds to a reverse voltage of the diode 9a, the diode 9a conducts. In such case, the diode controls an input voltage to the control terminal of the transistor 8a to a predeterminable control value. In this way, the transistor displays a higher resistance and a higher voltage fraction of the supply voltage falls across the transistor 8a. If for simplification one considers in the circuit only the transceiver unit 2, the transistor unit 8 and the first limiting unit 9, then the input voltage $U_{TI}$ of the transceiver unit 2 is composed of the difference between the voltage $U_9$ falling across the first limiting unit 9 and the voltage $U_8$ falling across the transistor unit 8:

$$U_{TI} = U_9 - U_8$$

The reverse voltage of the diode 9a is preferably so selected that it is greater than the supply voltage and less than the maximum allowable voltage of the transceiver unit 2. If the supply voltage exceeds a predeterminable limit value, which in this particular example is given by the reverse voltage of the diode 9a, then the diode 9a conducts and controls therewith the input voltage to the gate of the transistor 8 to the predeterminable control value. In this way, the electrical current flowing through the transistor 8 lessens and a higher voltage fraction falls across the transistor 8. This voltage fraction is always exactly large enough that the input voltage $U_{TI}$ of the transceiver unit 2 does not exceed the predeterminable transceiver-voltage value, which likewise is selected usually less than the maximum allowable value for the input voltage of the transceiver unit 2.

Present in the illustrated example of an embodiment, however, not absolutely necessary, are, additionally, a second 11 and a third limiting unit 12. The second limiting unit 11 comprises a varistor 11a and is arranged before the first limiting unit 9 and between a first 5a and a second supply line 5b of the transceiver unit 2, i.e. the electronics unit 1. The second limiting unit 11 cares thus, for a pre-limiting of the supply voltage.

The third limiting unit 12 serves for limiting a voltage applied on an in/out terminal element of the transceiver unit 2 against transient overvoltages. Serving as voltage limiting elements also here by way of example are diodes 12a.

Figure 4:
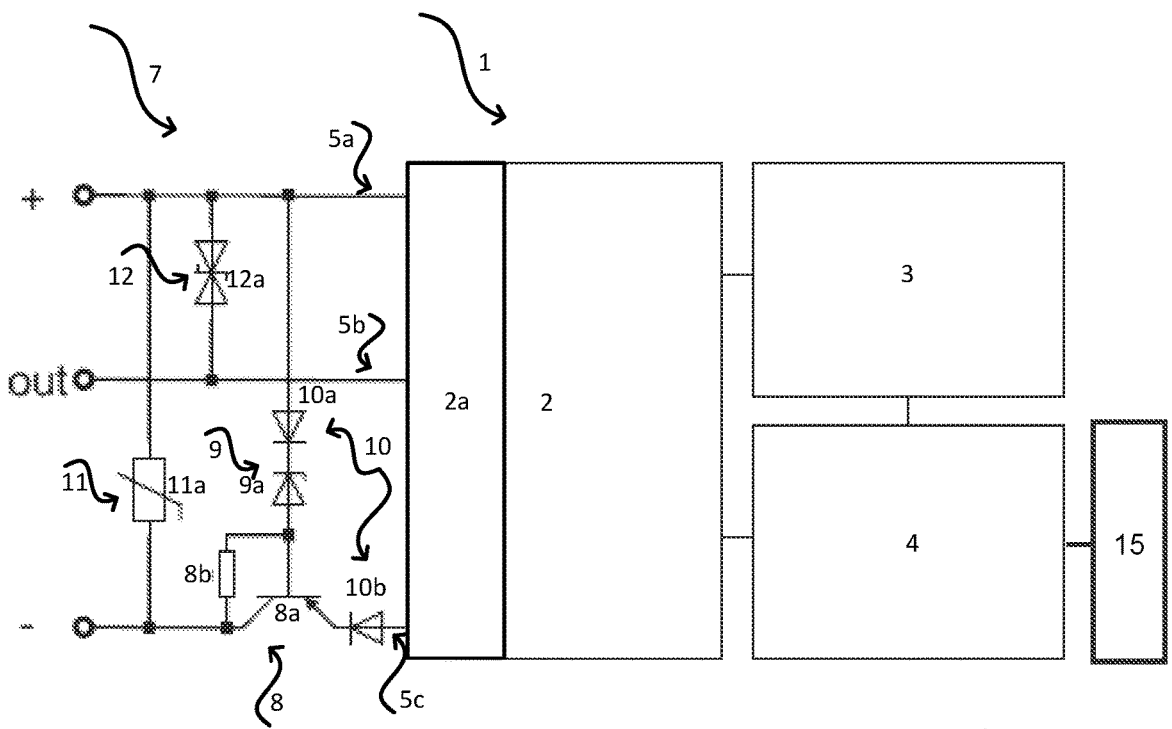
FIG. 4 shows a schematic view of an electronics unit of the present disclosure having a transceiver protecting unit in a second embodiment.
Figure 5:
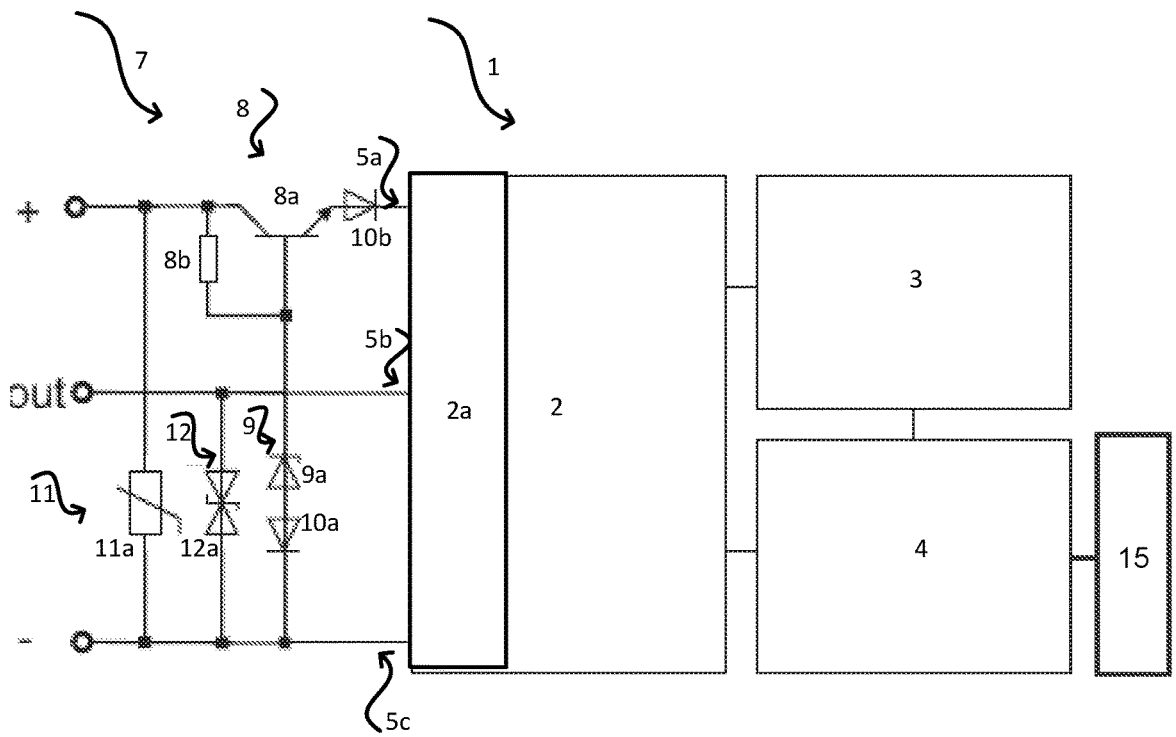
FIG. 5 shows a schematic view of an electronics unit of the present disclosure having a transceiver protecting unit in a third embodiment.

In second and third embodiments, such as shown in FIGS. 4 and 5, respectively, the apparatus includes, furthermore, a reverse protection unit 10, which is embodied to remove at least one signal portion of the supply voltage using a polarity opposite to the polarity of the input voltage of the transceiver unit 2. The reverse protection unit 10 comprises a first 10a and a second diode 10b. The first diode 10a is connected in series with the first limiting unit 9, while the second diode 10b is arranged between the transistor unit 8 and the transceiver unit 2. Thus, the reverse protection unit in the example of an embodiment in FIG. 4 protects the transistor unit 8 and the transceiver unit 2 from negative transients, since the diodes 10a and 10b act in their blocking directions upon the occurrence such transients.

While the transistor unit 8 is implemented in the embodiment of FIG. 4 in the minus-branch of the circuit arrangement, FIG. 5 shows an embodiment, in which the transistor unit 8 is located in the plus-branch. The operation of the individual components is analogous to their functions in FIGS. 3 and 4. Therefore, these details are not explored again for FIG. 5. It is only noted that the two diodes 10a and 10b of the reverse protection unit 10 protect against positive transients in the case of FIG. 5.

If the transceiver protecting unit, thus, includes a reverse protection circuit 10, then transients of different polarity can be handled with the same circuit arrangement.

The second 11 and third limiting unit 12 as well as the reverse protection unit 10 are preferably part of the transceiver protecting unit 7, along with the transistor unit 8 and the first limiting unit 9.

The invention claimed is:

1. An apparatus for determining and/or monitoring at least one process variable of a medium in a containment, the apparatus comprising: at least one sensor unit; and an electronics unit that includes a transceiver unit and a transceiver protecting unit configured to limit an input voltage of the transceiver unit to a first transceiver voltage value, wherein: the transceiver protecting unit includes a first limiting unit having a reversed-biased diode and further includes a transistor unit having at least one transistor; the transistor unit is connected in series with the transceiver unit; the first limiting unit is connected in parallel with transceiver unit and to a base of the transistor; and the first limiting unit is configured to control an input voltage of the base of the transistor to a predeterminable control value so that the input voltage of the transceiver unit is limited to the first transceiver voltage value when a supply voltage to the electronics unit exceeds a limit value, wherein the limit value corresponds to a reverse-breakdown voltage of the diode.

2. The apparatus of claim 1, wherein the transistor is a bipolar transistor with at least one resistance, especially an ohmic resistance, or a field effect transistor.

3. The apparatus of claim 1, further comprising a second limiting unit configured to limit the input voltage of the transceiver unit, wherein the second limiting unit is connected between a first supply line and a second supply line of the transceiver unit.

4. The apparatus of claim 3, wherein the second limiting unit includes at least one voltage limiting element.

5. The apparatus of claim 4, wherein the at least one voltage limiting element of the second limiting unit is a varistor, a gas discharger, a diode, a suppressor diode or a Transzorb® diode.

6. The apparatus of claim 1, further comprising a third limiting unit configured to limit a voltage applied to a terminal element of the transceiver unit.

7. The apparatus of claim 6, wherein the third limiting unit includes at least one voltage limiting element.

8. The apparatus of claim 7, wherein the at least one voltage limiting element of the third limiting unit is a diode, a suppressor diode, a Transzorb diode® or a varistor.

9. The apparatus of claim 1, further comprising a reverse protection unit configured to remove at least one signal portion of the supply voltage with a polarity opposite to the polarity of the input voltage of the transceiver unit.

10. The apparatus of claim 9, wherein the reverse protection unit includes at least two diodes.

11. The apparatus of claim 10, wherein a first diode is connected in series with the first limiting unit, and wherein a second diode is disposed between the transistor unit and the transceiver unit.

12. The apparatus of claim 1, wherein an input of the transceiver unit is implemented via a first terminal element and an output of the transceiver unit is implemented via a second terminal element.

13. The apparatus of claim 1, wherein the electronics unit is configured to supply the sensor unit with an excitation signal and to receive from the sensor unit a received signal representing the process variable.

14. The apparatus of claim 1, wherein the transceiver unit is at least partially an integrated circuit.

* * * * *